(12) United States Patent
Chang et al.

(10) Patent No.: US 10,948,211 B2
(45) Date of Patent: Mar. 16, 2021

(54) WATER CIRCULATION SYSTEM FOR AIR CONDITIONING SYSTEM AND CONTROL METHOD THEREOF

(71) Applicant: Carrier Corporation, Palm Beach Gardens, FL (US)

(72) Inventors: Liang Chang, Shanghai (CN); Jingwei Sun, Shanghai (CN); Pei Sun, Shanghai (CN); Lishan Wang, Shanghai (CN); Jian Ni, Shanghai (CN); Qing Lu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/409,544

(22) Filed: May 10, 2019

(65) Prior Publication Data
US 2019/0346168 A1    Nov. 14, 2019

(30) Foreign Application Priority Data

May 11, 2018    (CN) .......................... 201810447846.8

(51) Int. Cl.
*F24F 11/49*    (2018.01)
*F24F 3/06*    (2006.01)
(Continued)

(52) U.S. Cl.
CPC .............. *F24F 11/49* (2018.01); *F24F 3/065* (2013.01); *F24F 11/56* (2018.01); *F24F 11/61* (2018.01);
(Continued)

(58) Field of Classification Search
CPC .. F24F 3/065; F24F 11/30; F24F 11/49; F24F 11/56; F24F 11/61; F24F 11/62;
(Continued)

(56) References Cited

U.S. PATENT DOCUMENTS

| 5,517,830 A | * | 5/1996 | Ohuchi | F24F 3/06 |
| | | | | 62/476 |
| 6,095,426 A | * | 8/2000 | Ahmed | G05B 11/42 |
| | | | | 236/49.3 |

(Continued)

FOREIGN PATENT DOCUMENTS

| CN | 1317535 C | 5/2007 |
| CN | 101240933 B | 6/2010 |

(Continued)

*Primary Examiner* — Crystal J Barnes-Bullock
(74) *Attorney, Agent, or Firm* — Cantor Colburn LLP

(57) ABSTRACT

A water circulation system for air conditioning system and a control method thereof, wherein the water circulation loop comprises: a main loop provided with air-conditioning indoor units, air-conditioning outdoor units and an actuator, and a bypass branch connected between upstream and downstream of the air-conditioning outdoor units and provided with a bypass valve; the control method comprises: S100, starting the water circulation system after receiving a start command; S200, executing a PID control step after initialization and a first preset time period of the water circulation system; S300, executing a feed forward control step when the operating states of the air-conditioning indoor units and/or the air-conditioning outdoor units are changed, and going back to execute the PID control step after a second preset time period; and S400, executing a shutdown step of the water circulation system after receiving a shutdown command.

13 Claims, 3 Drawing Sheets

(51) Int. Cl.

| | | |
|---|---|---|
| *F24F 11/56* | (2018.01) | |
| *F24F 11/61* | (2018.01) | |
| *F24F 11/65* | (2018.01) | |
| *F24F 11/70* | (2018.01) | |
| *G05B 6/02* | (2006.01) | |
| *F24F 11/64* | (2018.01) | |
| *F24F 11/84* | (2018.01) | |
| *F25B 41/04* | (2006.01) | |
| *G05B 11/42* | (2006.01) | |
| *F24F 140/12* | (2018.01) | |
| *B60H 1/00* | (2006.01) | |

(52) U.S. Cl.
CPC .............. *F24F 11/64* (2018.01); *F24F 11/65* (2018.01); *F24F 11/70* (2018.01); *F24F 11/84* (2018.01); *F25B 41/04* (2013.01); *G05B 6/02* (2013.01); *G05B 11/42* (2013.01); *B60H 1/00885* (2013.01); *F24F 2140/12* (2018.01); *F25B 2600/2501* (2013.01); *G05B 2219/2614* (2013.01)

(58) Field of Classification Search
CPC .. F24F 11/63; F24F 11/64; F24F 11/65; F24F 11/70; F24F 2140/12; G05B 6/02; G05B 11/042; G05B 11/048; G05B 11/42; G05B 13/042; G05B 2219/2614; G05B 2219/2642; G05B 2219/43112; G05D 23/1393; G05D 23/1917; G05D 23/1919; G05D 23/1931; B60H 1/00885; F25B 41/04; F25B 2600/2501; F25F 11/0001; F25F 11/42; F25F 11/70; F25F 11/84

See application file for complete search history.

(56) References Cited

U.S. PATENT DOCUMENTS

| | | | |
|---|---|---|---|
| 6,922,613 | B2 | 7/2005 | Park et al. |
| 6,945,062 | B2 | 9/2005 | Chen et al. |
| 7,721,558 | B2 | 5/2010 | Ha et al. |
| 8,406,929 | B2 | 3/2013 | Duncan |
| 8,495,888 | B2 * | 7/2013 | Seem ................... F24F 11/0001 62/186 |
| 9,121,631 | B2 | 9/2015 | Cho et al. |
| 9,534,806 | B2 | 1/2017 | Kim et al. |
| 10,252,600 | B2 * | 4/2019 | Miyakoshi ......... B60H 1/00007 |
| 10,391,833 | B2 * | 8/2019 | Tang ................... B60H 1/00978 |
| 10,401,843 | B2 * | 9/2019 | House ...................... F24F 11/63 |
| 10,739,021 | B2 * | 8/2020 | Dempster ................ F24F 11/83 |
| 2003/0213246 | A1 * | 11/2003 | Coll ......................... F01K 17/02 60/653 |
| 2019/0144304 | A1 * | 5/2019 | Wang ..................... C05F 17/00 119/447 |
| 2019/0338974 | A1 * | 11/2019 | Turney .................... F24F 11/70 |
| 2019/0338979 | A1 * | 11/2019 | Ray .......................... F24F 11/67 |

FOREIGN PATENT DOCUMENTS

| | | |
|---|---|---|
| CN | 201589376 U | 9/2010 |
| CN | 102288421 A | 12/2011 |
| CN | 102353119 B | 4/2013 |
| CN | 203454337 U | 2/2014 |
| CN | 204301192 U | 4/2015 |
| CN | 205747333 U | 11/2016 |
| CN | 104776574 B | 8/2017 |
| CN | 104949274 B | 12/2017 |
| CN | 206803425 U | 12/2017 |
| CN | 105352109 B | 3/2018 |
| EP | 1698835 B1 | 8/2008 |
| JP | 4493123 B2 | 6/2010 |

* cited by examiner

WATER CIRCULATION SYSTEM FOR AIR CONDITIONING SYSTEM AND CONTROL METHOD THEREOF

FOREIGN PRIORITY

This application claims priority to Chinese Patent Application No. 201810447846.8, filed May 11, 2018, and all the benefits accruing therefrom under 35 U.S.C. § 119, the contents of which in its entirety are herein incorporated by reference.

FIELD OF THE INVENTION

The present invention relates to the field of refrigeration, particularly to a water circulation system for air conditioning system and a control method thereof.

BACKGROUND OF THE INVENTION

For some large commercial refrigeration systems, a water circulation system is typically configured as a medium to transfer heat between air-conditioning indoor units and air-conditioning outdoor units. Such a system generally has a plurality of air conditioning indoor units, a plurality of air conditioning outdoor units, and valves for individually controlling the opening and closing of the units. In addition, the entire system typically further comprises a main loop and a bypass branch, wherein a water pump for providing power is provided on the main loop, and a bypass valve for controlling diversion is provided on the bypass branch. For such a system with a variable water capacity, the water pump and the bypass valve also play a role in regulating the water flow rate to achieve energy savings and protect system components such as outdoor heat exchangers or water pipes. However, as there are state changes of a plurality of units in the operation process of the system, i.e., opening and closing control, it is difficult to control them well. Due to the nonlinear characteristic of the system, the problem of tight coupling of the actuator and pressure disturbance, a typical PID (proportional-integral-differential (controller)) control step can cause system vibration when applied in such systems and is unable to overcome serious disturbances, which will eventually lead to system shutdown or damage system parts and components such as outdoor heat exchangers or water pipes.

Therefore, how to provide a water circulation system that can maintain a stable pressure difference of the air conditioning outdoor units and a control method of the system is an urgent technical problem.

SUMMARY OF THE INVENTION

The present application intends to provide a control method of a water circulation system, which is used in an air conditioning system and capable of maintaining a stable pressure difference of air-conditioning outdoor units.

The present application also intends to provide a water circulation system, which is used in an air conditioning system and capable of maintaining a stable pressure difference of air-conditioning outdoor units.

In order to achieve the objectives of the present application, according to one aspect of the present application, a control method of a water circulation system for air conditioning system is provided, wherein the water circulation loop comprises: a main loop provided with air-conditioning indoor units, air-conditioning outdoor units and an actuator, and a bypass branch connected between upstream and downstream of the air-conditioning outdoor units and provided with a bypass valve; the control method comprises: S100, starting the water circulation system after receiving a start command; S200, executing a PID control step after initialization and a first preset time period of the water circulation system; S300, executing a feed forward control step when the operating states of the air-conditioning indoor units and/or the air-conditioning outdoor units are changed, and going back to execute the PID control step after a second preset time period; and S400, executing a shutdown step of the water circulation system after receiving a shutdown command.

Optionally, the start step comprises: adjusting the actuator to a first preset frequency and/or adjusting the bypass valve to a first preset opening degree and maintaining the first preset time period.

Optionally, the PID control step comprises: controlling the frequency of the actuator and/or the opening degree of the bypass valve and maintaining the pressure difference of the air-conditioning outdoor units in a preset range of pressure difference.

Optionally, the temperature difference between inlet water and outlet water of the air-conditioning outdoor units corresponding to the preset range of pressure difference is 5° C.

Optionally, the feed forward control step comprises: acquiring the operating states of the air-conditioning indoor units and the air-conditioning outdoor units and obtaining a feed forward rule through processing; and controlling the operation of the actuator and/or the bypass valve based on the feed forward rule when the operating states of the air-conditioning indoor units and the air-conditioning outdoor units are changed, and maintaining a second preset time period.

Optionally, the shutdown step comprises: adjusting the actuator to a preset frequency and/or adjusting the bypass valve to a preset opening degree.

Optionally, the control method further comprises: S500, performing split range control over the actuator and the bypass valve in the PID control step, the feed forward control step and/or the shutdown step, with the actuator being controlled in the first range and the bypass valve being controlled in the second range.

Optionally, the control method further comprises: providing nonlinear compensation for the split range control in the PID control step so that the frequency change of the actuator and the opening degree change of the bypass valve correspond to the pressure difference of the air-conditioning outdoor units.

Optionally, the control method further comprises: in the PID control step, normalizing the frequency of the actuator and/or the opening degree of the bypass valve inputted and the pressure difference of the air-conditioning outdoor units outputted in the PID control step.

Optionally, S300 further comprises: executing the feed forward control step again and timing the second preset time period again if the operating states of the air-conditioning indoor units and/or the air-conditioning outdoor units are changed again.

Optionally, the first preset time period is 5 s.

Optionally, the second preset time period is 20 s.

In order to achieve the objectives of the present application, according to another aspect of the present application, a water circulation system for air conditioning system is further provided, comprising: a main loop, provided with air-conditioning indoor units, air-conditioning outdoor units and an actuator; a bypass branch, provided with a bypass valve and communicable to upstream and downstream of the air-conditioning outdoor units in a controlled manner; and a state machine, which is used to execute the foregoing control method of the water circulation system for air conditioning system.

The water circulation system for air conditioning system and control method thereof according to the present application employ a PID control step to maintain stable pressure difference of the air-conditioning outdoor units in the water circulation system under the condition of stable operation; and employ a feed forward control step to maintain stable pressure difference of the air-conditioning outdoor units in the water circulation system during switching of operating states. In this way, the state disturbances caused by start and shutdown of the air-conditioning outdoor units and the air-conditioning indoor units can be quickly eliminated, avoiding unnecessary system shutdown caused by a low water flow rate and achieving better protection of the heat exchangers or water pipes of the outdoor units, thereby improving system stability and safety and eventually improving indoor temperature stability and customer comfort level.

DETAILED DESCRIPTION OF THE EMBODIMENTS

Figure 1:
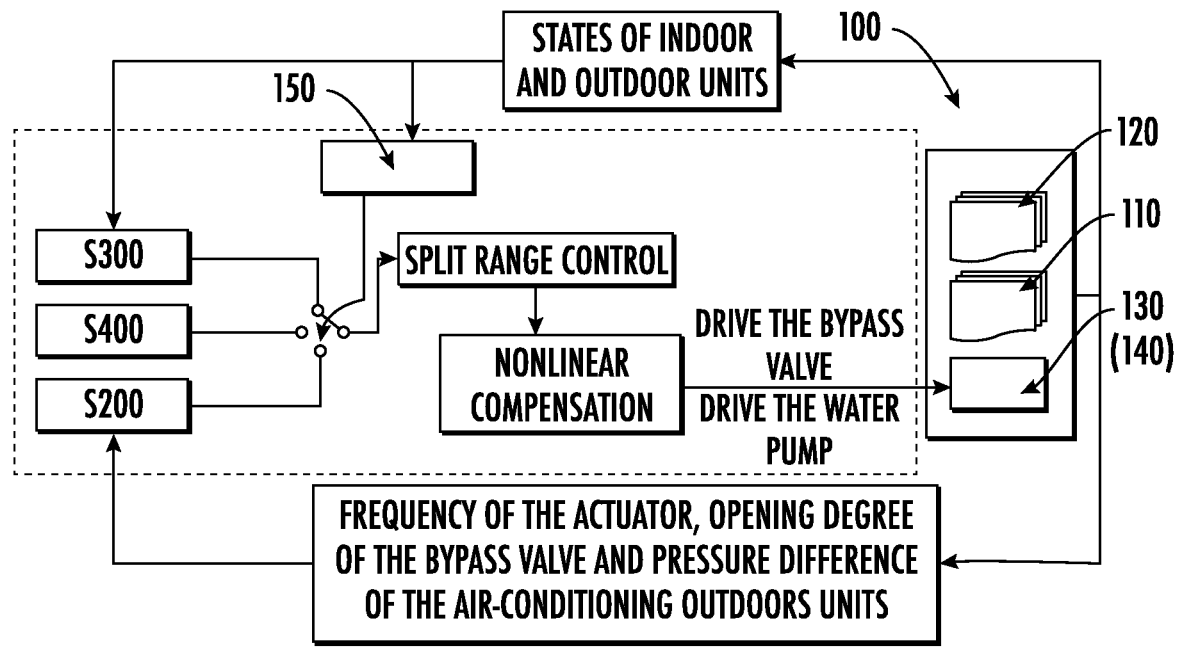
FIG. 1 is a schematic view of an embodiment of a water circulation system for air conditioning system according to the present application.

See FIG. 1. The present application here provides an embodiment of a water circulation system for air conditioning system. The water circulation system 100 comprises: a main loop, provided with air-conditioning indoor units 110, air-conditioning outdoor units 120 and an actuator 130; a bypass branch, provided with a bypass valve 140 and communicable to upstream and downstream of the air-conditioning outdoor units in a controlled manner; and a state machine 150, which is used to collect data and execute a corresponding control method. The main loop is a conventional loop of water circulation. Under the drive of the actuator 130, cooling water flows through the air-conditioning outdoor units 120 to dissipate heat and flows through the indoor units to absorb heat and raise temperature, thereby providing a refrigerating effect on the side of the indoor units. The bypass branch is used to control the volume of cooling water participating in water circulation in the main loop. Thus it can be seen that by adjusting the frequency of the actuator 130 and the opening degree of the bypass valve 140, the water flow in the water circulation system can be controlled, i.e., the refrigerating capacity of the system can be controlled.

Figure 2:
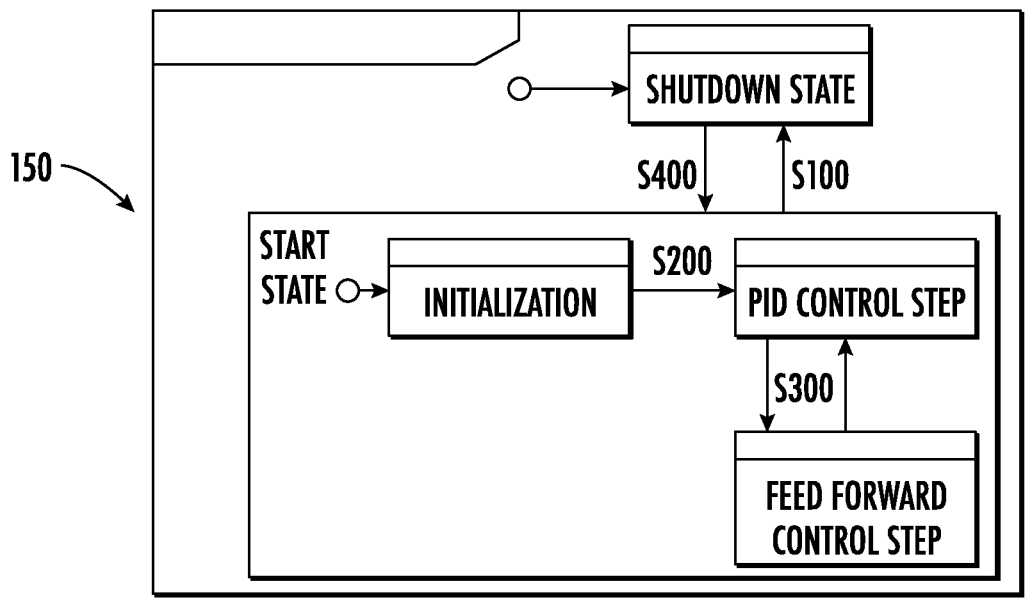
FIG. 2 is a schematic view of a control flow of an embodiment of a water circulation system for air conditioning system according to the present application.

Below the control method of water circulation system for air conditioning system according to the present application that is executed by the state machine will be illustrated by referring to FIG. 1 and FIG. 2. The control method comprises: S100, starting the water circulation system after receiving a start command; S200, executing a PID control step after initialization and a first preset time period of the water circulation system; S300, executing a feed forward control step when the operating states of the air-conditioning indoor units and/or the air-conditioning outdoor units are changed, and going back to execute the PID control step after a second preset time period; and S400, executing a shutdown step of the water circulation system after receiving a shutdown command.

This layout allows the system controller to decide the operating state of the controller through a state machine and realize switching of shutdown control, feed forward control and PID control. For example, after power-on of the entire system, the system is in a shutdown state and shutdown control logic is triggered; if a start command is received, the system will jump to a start state, and if a shutdown command is received, the system will jump back to a shutdown state again. After start, initialization and a first preset time period (e.g., 5 s), the system enters a PID state and invokes PID control logic. If the operating states of the air-conditioning indoor units or the air-conditioning outdoor units are changed, for example, the air-conditioning indoor units or the air-conditioning outdoor units are started or shut down, the system will enter a feed forward state and invoke feed forward control logic, and after a second preset time period (e.g., 20 s), will return to the PID state.

The control method employs a PID control step to maintain a stable pressure difference of the air-conditioning outdoor units in the water circulation system under the condition of stable operation; and employs a feed forward control step to maintain a stable pressure difference of the air-conditioning outdoor units in the water circulation system during switching of operating states. In this way, the state disturbances caused by start and shutdown of the air-conditioning outdoor units and the air-conditioning indoor units can be quickly eliminated, avoiding unnecessary system shutdown caused by a low water flow rate and achieving better protection of the heat exchangers or water pipes of the outdoor units, thereby improving system stability and safety and eventually improving indoor temperature stability and customer comfort level.

More specifically speaking, the start step comprises: adjusting the actuator to a first preset frequency and/or adjusting the bypass valve to a first preset opening degree, realizing initialization and maintaining the first preset time period. By now the system start process is completed and it is confirmed that the system is in a state of stable operation.

Further, the PID control step comprises: controlling the frequency of the actuator and/or the opening degree of the bypass valve and maintaining the pressure difference of the air-conditioning outdoor units in a preset range of pressure difference. At the moment, the temperature difference between inlet water and outlet water of the air-conditioning outdoor units corresponding to the preset range of pressure difference is 5° C.

Further, the feed forward control step comprises: acquiring the operating states of the air-conditioning indoor units and the air-conditioning outdoor units and obtaining a feed forward rule through model-based analysis and processing; and controlling the operation of the actuator and/or bypass valve in advance based on the feed forward rule when the operating states of the air-conditioning indoor units and the air-conditioning outdoor units are changed, and maintaining a second preset time period. For example, if a new air-conditioning outdoor unit needs to be started, the feed forward rule will calculate a command of output increase on the basis of the current command, thereby controlling operation of the water pump or the bypass valve. After actions of the air-conditioning indoor units and the air-conditioning outdoor units are completed and the timing of the second preset time period is completed, feed forward control is quit.

Further, the shutdown step comprises: adjusting the actuator to a preset frequency and/or adjusting the bypass valve to a preset opening degree.

Optionally, S300 further comprises: executing the feed forward control step again and timing the second preset time period again if the operating states of the air-conditioning indoor units and/or the air-conditioning outdoor units are changed again, thereby realizing tracking, coordination and control of the operating states of the air-conditioning indoor units and/or the air-conditioning outdoor units every time.

Figure 3:
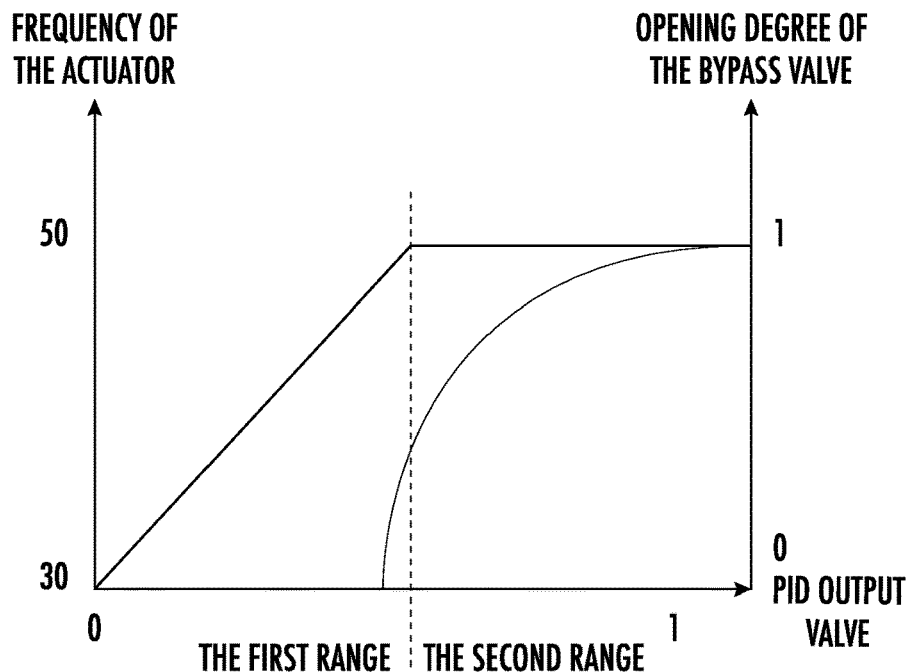
FIG. 3 is a schematic view of an embodiment of split range control according to the present application.
Figure 4:
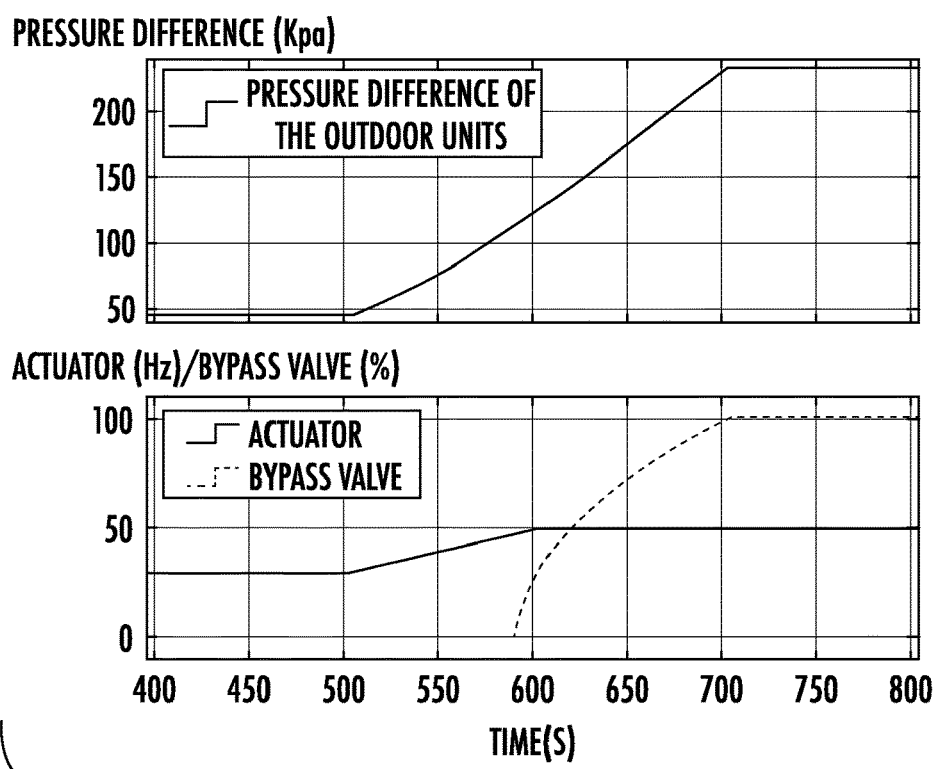
FIG. 4 is a schematic view of an embodiment of a nonlinear compensation method according to the present application.

Please continue to see FIG. 3 and FIG. 4. The method may further comprise: S500, performing split range control over the actuator and the bypass valve in the PID control step, the feed forward control step and/or the shutdown step, with the actuator being controlled in the first range and the bypass valve being controlled in the second range. In this way, actuator coupling between them can be effectively avoided. Further, they can cooperate with each other to adjust water flow rate and protect system components. As shown in FIG. 3, the thick solid line represents frequency change of the actuator. It can be known from the figure that in the first range where PID output value begins to increase from 0, the frequency increases linearly from 30 Hz till a maximum operating frequency 50 Hz and then maintains this frequency; the fine solid line represents opening degree change of the bypass valve. It can be known from the figure that in the second range when PID output values are changed, the opening degree is maintained at 0 in the first range where PID output value begins to increase from 0, and the opening degree begins to increase gradually from 0% till a maximum opening degree of 100% as the actuator are approximate to the maximum operating frequency and then maintains this opening degree. The lower diagram in FIG. 4 shows a complete operational process, while FIG. 3 may be considered as a middle section of the curve shown in the lower diagram of FIG. 4.

Further, nonlinear compensation is provided for the split range control in the PID control step so that the frequency change of the actuator and the opening degree change of the bypass valve linearly correspond to the pressure difference of the air-conditioning outdoor units. As shown in the upper diagram of FIG. 4, by mapping frequency change of the actuator and opening degree change of the bypass valve to pressure difference of the air-conditioning outdoor units, linear relations between the former two and the latter as shown in the figure are obtained.

Optionally, in the PID control step, the frequency of the actuator and/or the opening degree of the bypass valve inputted and the pressure difference of the air-conditioning outdoor units outputted in the PID control step are normalized. At the moment, the output limit of the PID control step is 0-1. The split range control maps normalized control output to the actuator and the opening degree of the bypass valve. The mapping relations are shown in FIG. 3. When PID output is 0, the actuator and the bypass valve are both shut down. When PID output is increased gradually, the frequency of the actuator is increased at first, followed by increase of the opening degree of the bypass valve. When PID output is 1, the frequency of the actuator and the opening degree of the bypass valve both reach the maximum. Now, when PID is changed in the range of 0-1, it shows mapping relations of one-to-one correspondence with the bypass valve and the actuator respectively, thereby avoiding system vibration caused by coupling of two actuator.

After split range design of the actuator and the bypass valve, as the bypass valve is a proportional valve, PID output is not in a linear relation with the pressure difference of the air-conditioning outdoor units. This will seriously affect the stability and rapidity of the control system. Therefore, a step of nonlinear compensation may be executed to conduct nonlinear mapping between PID output and the actuator/bypass valve. After the mapping, when PID changes in the range of 0-1, the pressure differences of the air-conditioning outdoor units can give a more linear response, thereby improving the performance of the control system.

It should be understood that the foregoing handling method is also applicable to the feed forward control step and the shutdown control step.

Figure 5:
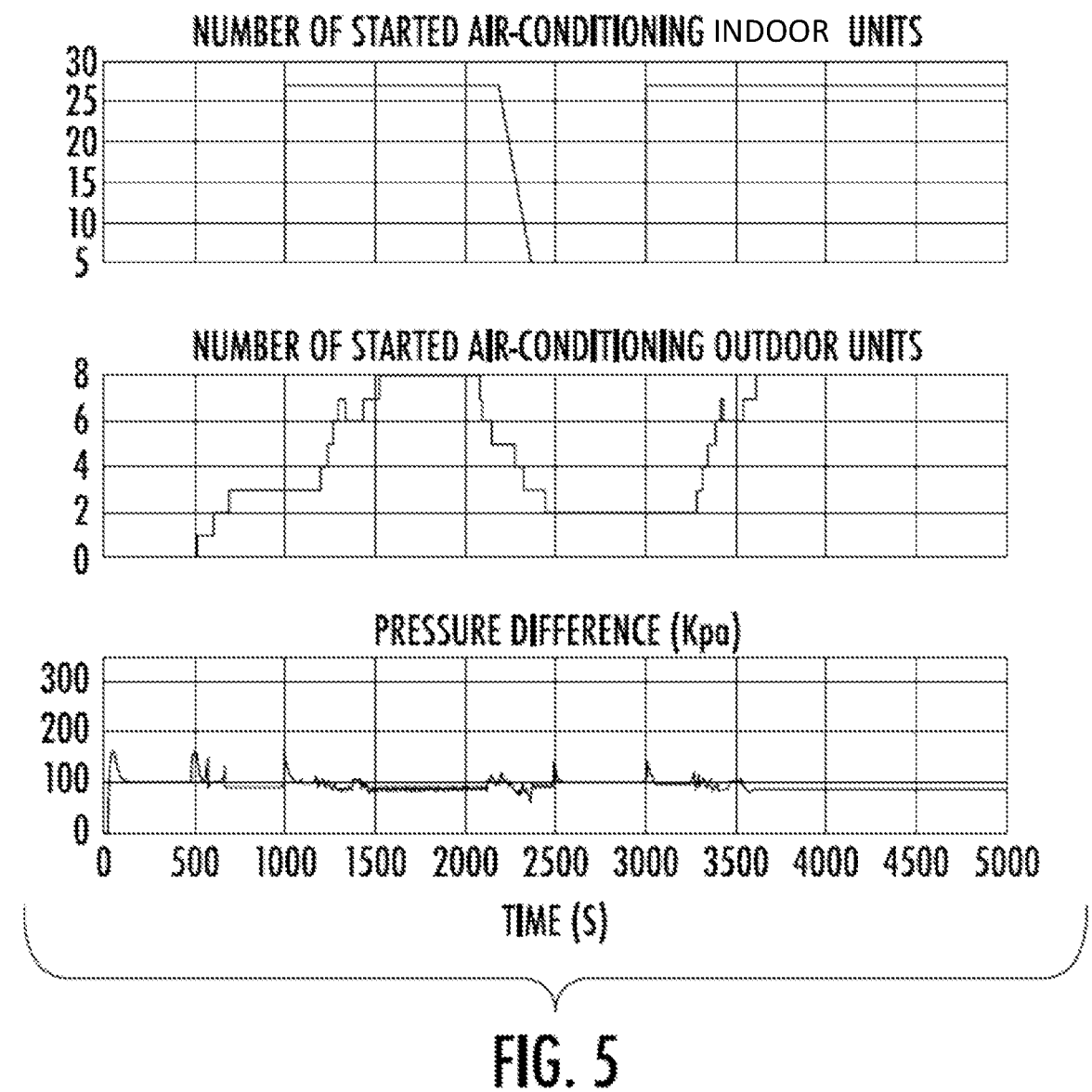
FIG. 5 is a schematic view of an embodiment of an operation process of a water circulation system for air conditioning system according to the present application.

Below application of the foregoing control method in an embodiment of a water circulation system for air conditioning system will be described by referring to FIG. 5. Specifically speaking, the air conditioning system is provided with eight air-conditioning outdoor units and 27 air-conditioning indoor units, and each of the air-conditioning outdoor units and the air-conditioning indoor units is provided with a separate water valve that controls its connectivity. Further, the main loop of the water circulation system is provided with a water pump, and its bypass branch is further provided with a bypass valve. The target set value of the water circulation system is for maintaining the pressure difference between the inlet pipe and outlet pipe of the air-conditioning outdoor units in the range of 90 Kpa-100 Kpa. FIG. 5 shows curve charts of system test results, where x-axis denotes operating time; the top chart is a variation curve of the number of open water valves of the air-conditioning indoor units (i.e., the number of started air-conditioning indoor units); the middle chart is a variation curve of the number of open water valves of the air-conditioning outdoor units (i.e., the number of started air-conditioning outdoor units); the bottom chart is a variation curve of pressure difference between the inlet pipe and outlet pipe of the air-conditioning outdoor units.

As shown in the figure, 0-500 s is a system startup stage. In this period, five water valves of the air-conditioning indoor units are open and one water valve of the air-conditioning outdoor units is open. Applying split range control in the present application can stably control the pressure difference between the two ends of the water pipeline of the air-conditioning outdoor units and quickly stabilize it in a set value range (the bottom chart in FIG. 5). At 1000 s and 3000 s as shown in the figure, even if the number of open water valves of the air-conditioning indoor units is abruptly changed from 5 to 27 (the top chart in FIG. 5), the pressure difference between the inlet and outlet pipes of the air-conditioning outdoor units can still be quickly stabilized within the set value (the bottom chart in FIG. 5).

However, for a conventional system, if a water pump and a bypass valve are used to control the pressure difference between the two ends of the water pipeline of the air-conditioning outdoor units and the pressure difference between the two ends of the water pipeline of the air-conditioning indoor units separately, mutual interference and impact will be caused to the water pipelines of the system because the water valves of the air-conditioning outdoor units and the water valves of the air-conditioning indoor units are all open at various degrees. In this case, the pressure difference between the two ends of the water pipeline of the air-conditioning outdoor units and the pressure difference between the two ends of the water pipeline of the air-conditioning indoor units will fluctuate violently and can be controlled with extreme difficulty.

Please continue to see FIG. 5. In the range of 3000-4000 s, the number of started air-conditioning outdoor units in the system is increased from 2 to 8 gradually. With the increase of open water valves of the air-conditioning outdoor units, the resistance of the water pipe network decreases gradually and the pressure difference between the two ends of the water pipeline of the air-conditioning outdoor units will fall, too. Under the adjustment in the dynamic feed forward control step of the present application, the pressure difference between the two ends of the water pipeline of the air-conditioning outdoor units can still be stabilized in the set value range (the bottom chart in FIG. 5).

However, for a conventional system, with the opening of water valves of the air-conditioning outdoor units, the pressure difference between the two ends of the water pipeline will decrease to some extent. If the air-conditioning outdoor units are started continuously and the pressure difference between the two ends of the water pipeline decreases continuously to a specific value, the water flow through each air-conditioning outdoor unit will decrease rapidly, which is liable to triggering the anti-icing protection of the system, resulting in shutdown and failure of the air conditioning system to provide a cooling capacity in a normal way. In another aspect, if the feed forward control quantity in the feed forward control algorithm is not dynamic, water pump frequency will keep increasing with the continuous startup of the air-conditioning outdoor units in the system. This will also cause unnecessary disturbance of the water pipeline.

It can be known from the foregoing test results and theoretical analysis that this control method has strong resistance to interference and is able to stably control the water circulation system when the number of open water valves of the air-conditioning outdoor units and air-conditioning indoor units in the system is changed.

The above examples mainly describe the water circulation system for air conditioning system and control method thereof provided by the present application. Although only some of embodiments of the present application have been described, those of ordinary skill in the art should understand that the present application can be implemented in many other forms without departing from the spirit and scope of the present application. Therefore, the disclosed examples and embodiments are schematic rather than restrictive, and the present application may cover various modifications and replacements under the condition of not departing from the spirit and scope of the present application as defined in the claims.

What is claimed is:

1. A control method of a water circulation system for air conditioning system, wherein the water circulation loop comprises: a main loop provided with air-conditioning indoor units, air-conditioning outdoor units and an actuator, and a bypass branch connected between upstream and downstream of the air-conditioning outdoor units and provided with a bypass valve; and the control method comprises:
    S100, starting the water circulation system after receiving a start command;
    S200, executing a PID control step after initialization and a first preset time period of the water circulation system;
    S300, executing a feed forward control step when the operating states of the air-conditioning indoor units and/or the air-conditioning outdoor units are changed, and going back to execute the PID control step after a second preset time period; and
    S400, executing a shutdown step of the water circulation system after receiving a shutdown command.

2. The control method according to claim 1, wherein the start step comprises: adjusting the actuator to a first preset frequency and/or adjusting the bypass valve to a first preset opening degree and maintaining the first preset time period.

3. The control method according to claim 1, wherein the PID control step comprises: controlling the frequency of the actuator and/or the opening degree of the bypass valve and maintaining the pressure difference of the air-conditioning outdoor units in a preset range of pressure difference.

4. The control method according to claim 3, wherein the temperature difference between inlet water and outlet water of the air-conditioning outdoor units corresponding to the preset range of pressure difference is 5° C.

5. The control method according to claim 1, wherein the feed forward control step comprises: acquiring the operating states of the air-conditioning indoor units and the air-conditioning outdoor units and obtaining a feed forward rule through processing; and
    controlling the operation of the actuator and/or the bypass valve based on the feed forward rule when the operating states of the air-conditioning indoor units and the air-conditioning outdoor units are changed, and maintaining a second preset time period.

6. The control method according to claim 1, wherein the shutdown step comprises: adjusting the actuator to a second preset frequency and/or adjusting the bypass valve to a second preset opening degree.

7. The control method according to claim 1, wherein the control method further comprises: S500, performing split range control over the actuator and the bypass valve in the PID control step, the feed forward control step and/or the shutdown step, with the actuator being controlled in the first range and the bypass valve being controlled in the second range.

8. The control method according to claim 7, wherein the control method further comprises: providing nonlinear compensation for the split range control in the PID control step so that the frequency change of the actuator and the opening degree change of the bypass valve correspond to the pressure difference of the air-conditioning outdoor units.

9. The control method according to claim 7, wherein the control method further comprises: in the PID control step, normalizing the frequency of the actuator and/or the opening degree of the bypass valve inputted and the pressure difference of the air-conditioning outdoor units outputted in the PID control step.

10. The control method according to claim 1, wherein S300 further comprises: executing the feed forward control step again and timing the second preset time period again if the operating states of the air-conditioning indoor units and/or the air-conditioning outdoor units are changed again.

11. The control method according to claim 1, wherein the first preset time period is 5 s.

12. The control method according to claim 1, wherein the second preset time period is 20 s.

13. A water circulation system for air conditioning system, comprising:
    a main loop, provided with air-conditioning indoor units, air-conditioning outdoor units and an actuator;

a bypass branch, provided with a bypass valve and communicable to upstream and downstream of the air-conditioning outdoor units in a controlled manner; and a state machine, which is used to execute the control method of claim 1.

\* \* \* \* \*